Patented Apr. 3, 1951

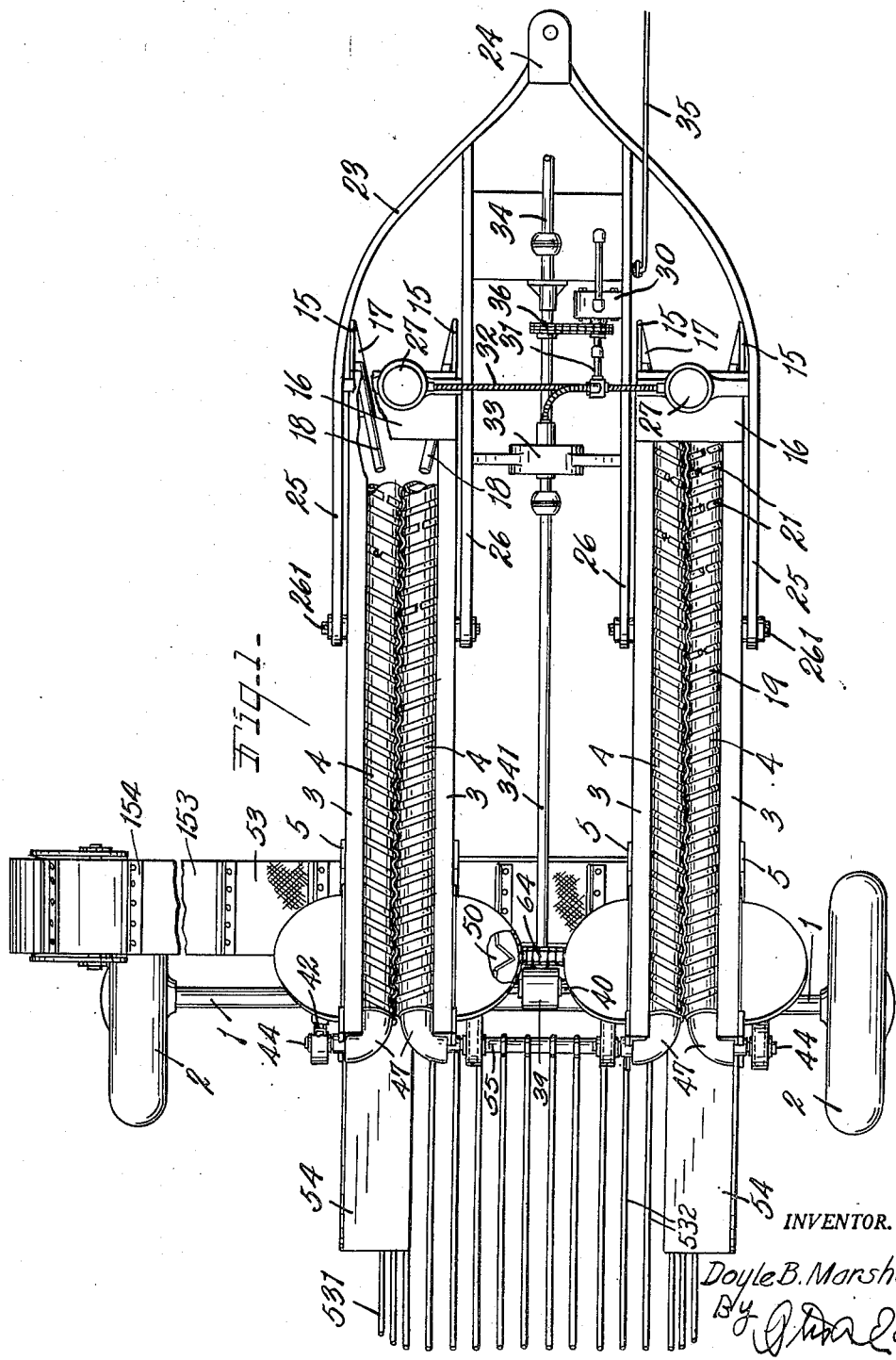

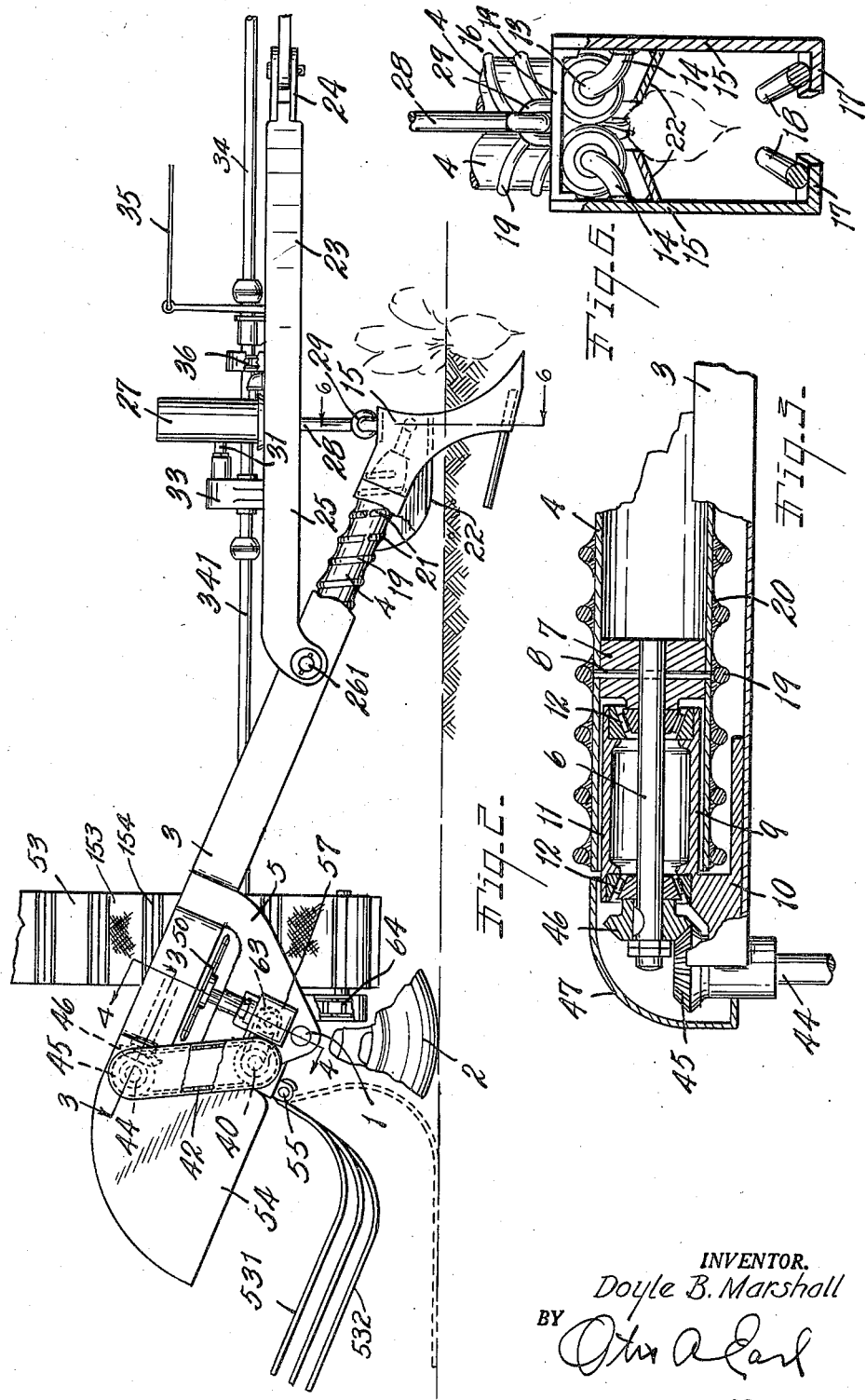

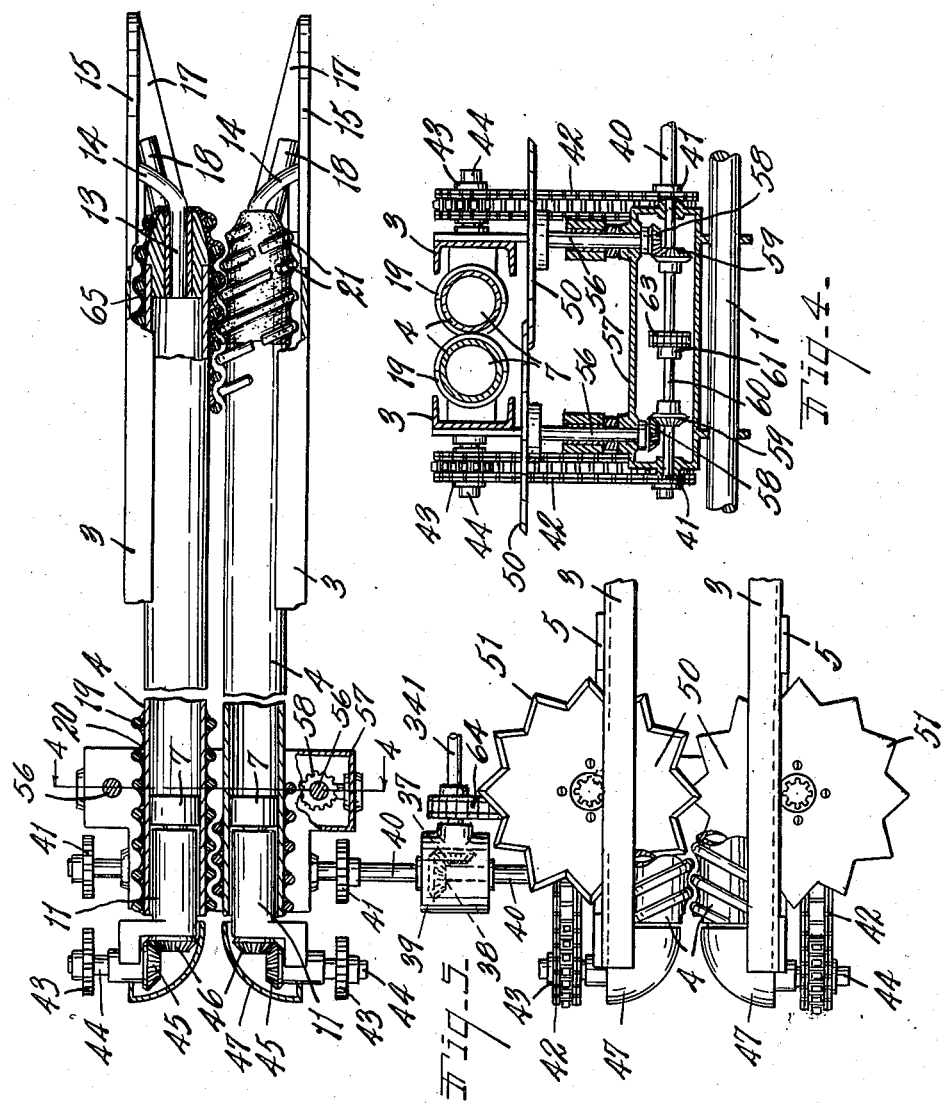

2,547,878

UNITED STATES PATENT OFFICE 2,547,878

ROOT CROP HARVESTER HAVING TOPPING MEANS

Doyle B. Marshall, Marshall, Mich.

Application April 26, 1946, Serial No. 665,259

14 Claims. (Cl. 55—108)

1

The main objects of this invention are:

First, to provide a pulling and topping machine for beets and the like which is highly efficient in lifting the roots from the ground, picking them up by the tops, and conveying them by the tops to a cutter means and properly presenting to the cutter means.

Second, to provide a machine of this character which is of large capacity and at the same time comparatively simple in structure and easy to operate.

Third, to provide a structure having these advantages in which the severed roots are delivered at one side of the machine and the tops gathered and delivered in piles.

Objects relating to details and economies of the invention will appear from the description to follow. The invention is defined and pointed out in the claims.

A preferred embodiment of the invention is illustrated in the accompanying drawings, in which:

Fig. 1 is a plan view of a machine embodying my invention, parts being broken away to better disclose structural details.

Fig. 2 is a fragmentary side elevation.

Fig. 3 is an enlarged fragmentary view partially in section on line 3—3 of Fig. 2.

Fig. 4 is a fragmentary view in transverse section on line 4—4 of Fig. 5.

Fig. 5 is an enlarged fragmentary view with certain parts in horizontal section and other parts broken away and still other parts omitted illustrating various structural details.

Fig. 6 is an enlarged fragmentary view in vertical section on a line corresponding to line 6—6 of Fig. 2.

The embodiment of my invention illustrated is especially designed as a sugar beet harvesting machine. It is designed to pull or lift the beets, convey them to cutters to sever the tops and deliver the beets and the tops separately, all without injury to the beets. The structure illustrated is a double row machine but as the mechanism for each row is duplicated the description of a single unit will suffice although there are certain features of the machine common to both units and these will be carried out.

The carriage comprises an axle 1 and carrying wheels 2 which are preferably pneumatic. The main frame comprises pairs of forwardly inclined longitudinal bars 3 of channel section arranged to face inwardly or in opposed relation to each other. These are laterally spaced to receive the spirally ribbed rollers 4 between them.

2

The rear ends of these longitudinal bars are supported by the standards 5 projecting upwardly from the axle and carried thereby. These standards or uprights have suitable bearings on the axle but I have not illustrated them.

The longitudinal bars 3 constitute side guards for the conveyor rollers. The rear ends of the conveyor rollers are provided with supporting and driving shafts 6 which are disposed centrally within the rollers and secured thereto by the blocks 7 having transverse pins 8 arranged through the inner ends of the shafts and blocks and extending into the rollers. The blocks may be otherwise secured to the rollers.

The bearings designated generally by the numeral 9 comprise the bearing blocks 10 having tubular outer bearing members 11 projecting into the rollers, and tapered roller bearing units 12 being disposed within the bearing members 11 and supporting the shafts therein.

The forward ends of the conveyor rollers are supported by the stub shafts or spindles 13 which have laterally turned forward ends 14 secured to the inner sides of the plow standards 15 as is clearly illustrated in Figs. 5 and 6. The forward ends of the longitudinal bars 3 are secured to the crosspiece 16 at the upper ends of the standards 15, this crosspiece constituting a support for the standards and also connecting the front ends of the longitudinal bars.

At their lower ends, the standards are provided with blades 17 arranged in a forwardly inclined relation and converging rearwardly. Rearwardly converging lifting rods 18 extend from the lifting blades rearwardly to lift or elevate the roots to present their tops to the conveyor rollers.

The conveyor rollers are provided with spiral ribs 19 preferably of curved section and may be practically formed of wire of suitable gauge wound spirally around the rollers and secured thereto throughout as by means of solder or welding as shown at 20. The forward ends of these ribs, however, are preferably formed of spaced segments 21 which provide a more effective gripping of the tops and the spreading of the tops between the rollers so that the roots are carried along sustained by the tops. Desirably these segments are of increasing length rearwardly, the ribs being continuous for a substantial part of the length of the rollers.

Guard plates 22 are secured to the inner sides of the standards 15 in forwardly and outwardly downwardly inclined relation with respect to the standards. The guard plates are spaced below the front or lower ends of the rollers 4 with the opposed edges of the plates 22 spaced to permit the tops of vegetables to rise therebetween to the rollers while limiting upward movement of the roots as is best illustrated in Fig. 6.

The front ends of the units are supported by the auxiliary or draft frame designated generally by the numeral 23 and provided with a coupling 24 at its front end adapted to be attached to a tractor, the front end of the frame 23 being supported by the tractor. The rear end of the frame 23 which comprises the pairs of draw bar members 25 and 26 is pivotally secured to the outer sides of the bars 3 by means of the coupling indicated at 261. The front ends of the bars 3 are adjustably supported from the auxiliary frame by means of the hydraulic cylinders 27 and the coacting plungers not illustrated, the plungers having plunger rods 28 which constitute adjustable hangers, these plunger rods being connected at 29 to the crosspieces 16—see Figs. 2 and 6.

In the embodiment illustrated, a pump 30 is provided, the pump being shown conventionally, this being connected by the conduits 31 and 32 to the cylinders and also connected to the hydraulic clutch 33. The driving shaft 34 is designed to be driven from the power take-off of the tractor.

I have not illustrated the valve control connections for the pump delivery and the raising and lowering means but I have indicated at 35 a remote control. The driving connections from the driving shaft 34 to the pump is indicated as a chain at 36.

The rear section 341 of the shaft 34 extends rearwardly from the clutch 33 and is connected at its rear end by the beveled gears 37 and 38 conventionally shown in the gear box 39 to the driven or jack shaft 40 which extends transversely below the rear ends of the conveyor rollers and is provided with pairs of sprockets 41 connected by the sprocket chains 42 to sprockets 43 on the shafts 44 having beveled gears 45 meshing with the gears 46 on the rear ends of the shafts 6. Housings 47 are provided for the gears 45 and 46, these being curved so that they serve as guides for the tops delivered from the conveyor rollers and also protecting the gears and bearings.

As the roots are carried along or conveyed by the tops they are brought into coacting relation to the disk cutters 50 which are provided with relatively large teeth 51 and arranged so that the teeth are brought into overlapping relation as the cutters revolve. These cutters effectively sever the tops. The severed roots drop onto the conveyor 53 which is disposed transversely below the two units and delivers in an upwardly inclined direction at one side of the machine. The conveyor 53 includes a belt 153 trained over suitable pulleys and having root advancing cross bars 154 secured thereto. The tops are discharged by the conveyor rollers 4 onto the carrier 531 mounted at the rear of the machine, guides 54 being provided at each side to direct the tops onto the carrier. The carrier is dropped downwardly when it becomes loaded as is indicated by dotted lines in Fig. 2 and the collected tops are scraped off as the machine advances. The carrier comprises a series of tine-like fingers 532. The fingers 532 of the carrier are supported on the rockshaft 55, operating means for the rockshaft not being illustrated as it may be a conventional remote control means and forms no part of my present invention.

The cutters are mounted on the upright shafts 56 which extend into the gear box 57 which houses suitable gears. The gears 58 on the lower ends of the shafts 56 are driven by the gears 59 on the shaft 60 which is provided with the sprocket 61 connected to the sprocket 62 on shaft 40 by the drive chain 63. The conveyor 53 is driven by suitable sprockets and chain 64 from the rear section of the drive shaft 341.

I have illustrated and described my invention in a highly practical embodiment thereof. I have not attempted to illustrate or describe all possible modifications or adaptations of my invention as it is believed that this disclosure will enable those skilled in the art to embody or adapt my invention as may be desired.

Having thus described my invention, what I claim as new and desire to secure by Letters Patent, is:

1. In a machine of the class described, the combination with a carriage, of a main frame tiltably mounted on said carriage and comprising a pair of laterally spaced forwardly inclined longitudinal bars of channel section disposed with their channels in facing relation, an auxiliary frame pivotally connected to said longitudinal bars in rearward substantially spaced relation to their front ends, means on said auxiliary frame for raising and lowering the front ends of said longitudinal bars, a pair of laterally spaced lifting plows comprising standards mounted on the front ends of said longitudinal bars and forwardly inclined blades at the lower ends of the standards and projecting laterally toward each other, the inner edges of the blades being spaced, the blades being provided with rearwardly projecting converging lifting rods, coacting tubular conveyor rollers having forwardly tapered front ends disposed in spaced relation between said longitudinal bars which constitute side guards therefor, said rollers having spiral ribs of rounded section arranged in spaced intermeshing relation, the ribs at the front ends of the rollers comprising a plurality of spaced complementary segments, supporting and driving shafts at the rear ends of said rollers, stub shafts for the front ends of the rollers, said stub shafts having laterally curved supporting portions secured to said standards, inwardly and upwardly inclined guard members on said standards disposed below the front ends of the rollers with their opposed edges in spaced relation to permit the tops of vegetables to be engaged by the rollers while limiting the upward movement of the roots of the vegetables, a pair of coacting cutters having teeth of substantial size arranged below and adjacent the rear ends of the rollers to act on the tops carried by the rollers, and drive means for the said driving shafts and cutters.

2. In a machine of the class described, the combination with a carriage, of a main frame tiltably mounted on said carriage and comprising a pair of laterally spaced forwardly inclined longitudinal bars, an auxiliary frame pivotally connected to said longitudinal bars in rearward substantially spaced relation to their front ends, means on said auxiliary frame for raising and lowering the front ends of said longitudinal bars, a pair of laterally spaced lifting plows comprising standards mounted on the front ends of said longitudinal bars and forwardly inclined blades at the lower ends of the standards and projecting laterally toward each other, the inner edges of the blades being spaced, the blades being provided with rearwardly projecting converging lifting rods, coacting tubular conveyor rollers disposed in spaced relation between said longitudinal bars which constitute side guards therefor, said rollers having spiral ribs arranged in spaced intermeshing relation, the ribs at the front ends of the rollers comprising a plurality of spaced complementary segments, supporting and driving shafts at the rear ends of said rollers, stub shafts for the front ends of the rollers, said stub shafts having laterally curved supporting portions secured to said standards, inwardly and upwardly inclined guard members on said standards disposed below the front ends of the rollers with their opposed edges in spaced relation to permit the tops of vegetables to be engaged by the rollers while limiting the upward movement of the roots of the vegetables, a pair of coacting cutters arranged below and adjacent the rear ends of the rollers to act on the tops carried by the rollers, and drive means for the said driving shafts and cutters.

3. In a machine of the class described, the combination with a carriage, of a main frame tiltably mounted on said carriage and comprising a pair of laterally spaced forwardly inclined longitudinal bars, an auxiliary frame pivotally connected to said longitudinal bars in rearward substantially spaced relation to their front ends, means on said auxiliary frame for raising and lowering the front ends of said longitudinal bars, a pair of laterally spaced lifting plows comprising standards mounted on the front ends of said longitudinal bars and forwardly inclined blades at the lower ends of the standards and projecting laterally toward each other, the inner edges of the blades being spaced, the blades being provided with rearwardly projecting converging lifting rods, coacting tubular conveyor rollers disposed in spaced relation between said longitudinal bars which constitute side guards therefor, said rollers having spiral ribs arranged in spaced intermeshing relation, supporting and driving shafts at the rear ends of said rollers, stub shafts for the front ends of the rollers, said stub shafts having laterally curved supporting portions secured to said standards, inwardly and upwardly inclined guard members on said standards disposed below the front ends of the rollers with their opposed edges in spaced relation to permit the tops of vegetables to be engaged by the rollers while limiting the upward movement of the roots of the vegetables, a pair of coacting cutters arranged below and adjacent the rear ends of the rollers to act on the tops carried by the rollers, and drive means for the said driving shafts and cutters.

4. In a machine of the class described, the combination with a carriage, of a main frame tiltably mounted on said carriage and comprising a pair of laterally spaced forwardly inclined longitudinal bars, an auxiliary frame pivotally connected to said longitudinal bars in rearward substantially spaced relation to their front ends, means on said auxiliary frame for raising and lowering the front ends of said longitudinal bars, a pair of laterally spaced lifting plows comprising standards mounted on the front ends of said longitudinal bars and forwardly inclined blades at the lower ends of the standards and projecting laterally toward each other, the inner edges of the blades being spaced, the blades being provided with rearwardly projecting converging lifting rods, coacting tubular conveyor rollers disposed in spaced relation between said longitudinal bars which constitute side guards therefor, said rollers having spiral ribs arranged in spaced intermeshing relation, supporting and driving shafts at the rear ends of said rollers, stub shafts for the front ends of the rollers, said stub shafts having laterally curved supporting portions secured to said standards, inwardly and upwardly inclined guard members on said standards disposed below the front ends of the rollers with their opposed edges in spaced relation to permit the tops of vegetables to be engaged by the rollers while limiting the upward movement of the roots of the vegetables, a pair of coacting cutters arranged below and adjacent the rear ends of the rollers to act on the tops carried by the rollers, a delivery conveyor extending transversely below the cutters to receive the roots severed from the tops by the cutters, drive means for the said driving shafts and cutters, and a top carrier disposed at the rear of the rollers to receive the severed tops.

5. In a machine of the class described, the combination with a carriage, of a main frame tiltably mounted on said carriage and comprising a pair of laterally spaced forwardly inclined longitudinal bars, an auxiliary frame pivotally connected to said longitudinal bars in rearward substantially spaced relation to their front ends, means on said auxiliary frame for raising and lowering the front ends of said longitudinal bars, a pair of laterally spaced lifting plows comprising standards mounted on the front ends of said longitudinal bars and forwardly inclined blades at the lower ends of the standards and projecting laterally toward each other, the inner edges of the blades being spaced, the blades being provided with rearwardly projecting converging lifting rods, coacting tubular conveyor rollers disposed in spaced relation between said longitudinal bars which constitute side guards therefor, said rollers having spiral ribs arranged in spaced intermeshing relation, supporting and driving shafts at the rear ends of said rollers, inwardly and upwardly inclined guard members disposed below the front ends of the rollers with their opposed edges in spaced relation to permit the tops of vegetables to be engaged by the rollers while limiting the upward movement of the roots of the vegetables, a pair of coacting cutters arranged below and adjacent the rear ends of the rollers to act on the tops carried by the rollers, and drive means for the said driving shafts and cutters.

6. In a machine of the class described, the combination with a carriage, of a main frame tiltably mounted on said carriage and comprising a pair of laterally spaced forwardly inclined longitudinal bars, an auxiliary frame pivotally connected to said longitudinal bars in rearward substantially spaced relation to their front ends, means on said auxiliary frame for raising and lowering the front ends of said longitudinal bars, lifting plows at the front ends of said longitudinal bars and coacting conveyor rollers having forwardly tapered front ends disposed in spaced relation between said longitudinal bars, said rollers having spiral ribs arranged in spaced intermeshing relation, the ribs at the front ends of the rollers comprising a plurality of spaced complementary segments, supporting and driving shafts for said rollers, stub shafts for the front ends of the rollers having laterally curved supporting portions constituting guides, guard members disposed below the front ends of the rollers with their opposed edges in spaced relation to permit the tops of vegetables to be engaged by the rollers while limiting the upward movement of the roots of the vegetables, cutters arranged below and adjacent the rear ends of the rollers to act on the tops carried by the rollers, and drive means for the said driving shafts and cutters.

7. In a machine of the class described, the combination with a carriage, of a main frame tiltably mounted on said carriage and comprising a pair of laterally spaced forwardly inclined longitudinal bars, an auxiliary frame pivotally connected to said longitudinal bars in rearward substantially spaced relation to their front ends, means on said auxiliary frame for raising and lowering the front ends of said longitudinal bars, lifting plows at the front ends of said longitudinal bars and coacting conveyor rollers disposed in spaced relation between said longitudinal bars, said rollers having spiral ribs arranged in spaced intermeshing relation, supporting and driving shafts for said rollers, stub shafts for the front ends of the rollers having laterally curved supporting portions constituting guides, guard members disposed below the front ends of the rollers with their opposed edges in spaced relation to permit the tops of vegetables to be engaged by the rollers with their opposed edges while limiting the upward movement of the roots of the vegetables, cutters arranged below and adjacent the rear ends of the rollers to act on the tops carried by the rollers, and drive means for the said driving shafts and cutters.

8. In a machine of the class described, the combination with a carriage, of a main frame tiltably mounted on said carriage and comprising a pair of laterally spaced forwardly inclined longitudinal bars, an auxiliary draft frame pivotally connected to said longitudinal bars in rearward substantially spaced relation to their front ends, means on said auxiliary frame for raising and lowering the front ends of said longitudinal bars, lifting plows at the front ends of said longitudinal bars and coacting conveyor rollers disposed in spaced relation between said longitudinal bars, said rollers having spiral ribs arranged in spaced intermeshing relation, supporting and driving shafts for said rollers, stub shafts for the front ends of the rollers having laterally curved supporting portions constituting guides, guard members disposed below the front ends of the rollers with their opposed edges in spaced relation to permit the tops of vegetables to be engaged by the rollers while limiting the upward movement of the roots of the vegetables, cutters arranged below and adjacent the rear ends of the rollers to act on the tops carried by the rollers, a delivery conveyor extending transversely below the cutters to receive the roots severed from the tops by the cutters, drive means for the said driving shafts and cutters, and a top carrier disposed at the rear of the rollers to receive the severed tops.

9. In a machine of the class described, the combination with a carriage, of a pair of laterally spaced lifting plows comprising standards and forwardly inclined blades at the lower ends of the standards and projecting laterally toward each other, the inner edges of the blades being spaced, the blades being provided with rearwardly projecting converging lifting rods, parallel thrust beams pivoted on said carriage and inclined forwardly to said standards to support said standards, tubular conveyor rollers having forwardly tapered front ends disposed in spaced forwardly inclined coacting parallel relation, said rollers having spiral ribs arranged in spaced intermeshing relation, the ribs at the front ends of the rollers comprising a plurality of spaced complementary segments, the segments increasing in length towards the rear of the rollers, supporting and driving shafts on said beams at the rear ends of said rollers, stub shafts for the front ends of the rollers, said stub shafts having laterally curved supporting portions connected to said standards constituting guides, plate-like inwardly and upwardly inclined guard members disposed below the front ends of the rollers with their opposed edges in spaced relation to permit the tops of vegetables to be engaged by the rollers while limiting the upward movement of the roots of the vegetables, cutters arranged below and adjacent the rear ends of the rollers to act on the tops carried by the rollers, and drive means carried by the rear ends of the beams for the rear ends of the driving shafts and cutters.

10. In a machine of the class described, the combination with a carriage, of a pair of laterally spaced lifting plows comprising standards and forwardly inclined blades at the lower ends of the standards and projecting laterally toward each other, the inner edges of the blades being spaced, the blades being provided with rearwardly projecting converging lifting rods, parallel thrust beams pivoted on said carriage and inclined forwardly to said standards to support said standards, tubular conveyor rollers having forwardly tapered front ends disposed in spaced forwardly inclined coacting parallel relation, said rollers having spiral ribs arranged in spaced intermeshing relation, the ribs at the front ends of the rollers comprising a plurality of spaced complementary segments, supporting and driving shafts on said beams at the rear ends of said rollers, stud shafts for the front ends of the rollers, said stub shafts having laterally curved supporting portions connected to said standards constituting guides, plate-like inwardly and upwardly inclined guard members on said standards disposed below the front ends of the rollers with their opposed edges in spaced relation to permit the tops of vegetables to be engaged by the rollers while limiting the upward movement of the roots of the vegetables, cutters arranged below and adjacent the rear ends of the rollers to act on the tops carried by the rollers, and drive means carried by the rear ends of the beams for the rear ends of the driving shafts and cutters.

11. In a machine of the class described, the combination with a carriage, of a pair of laterally spaced lifting plows carried by the carriage and comprising standards and forwardly inclined blades at the lower ends of the standards and projecting laterally toward each other, the inner edges of the blades being spaced, the blades being provided with rearwardly projecting converging lifting rods, tubular conveyor rollers having forwardly tapered front ends disposed in spaced forwardly inclined coacting parallel relation, said rollers having spiral ribs arranged in spaced intermeshing relation, supporting and driving shafts at the rear ends of said rollers, stub shafts for the front ends of the rollers, said stub shafts having laterally curved supporting portions constituting guides, inwardly and upwardly inclined guard members on said standards disposed below the front ends of the rollers with their opposed edges in spaced relation to permit the tops of vegetables to be engaged by the rollers while limiting the upward movement of the roots of the vegetables, cutters arranged below and adjacent the rear ends of the rollers to act on the tops carried by the rollers, and drive means on the carriage for the rear ends of the driving shafts and cutters.

12. In a machine of the class described, the combination with a carriage, of a pair of laterally spaced lifting plows carried by the carriage and comprising standards and forwardly inclined blades at the lower ends of the standards and projecting laterally toward each other, the inner edges of the blades being spaced, the blades being provided with rearwardly projecting converging lifting rods, tubular conveyor rollers having forwardly tapered front ends disposed in spaced forwardly inclined coacting parallel relation, said rollers having spiral ribs arranged in spaced intermeshing relation, supporting and driving shafts on said carriage at the rear ends of said rollers, stub shafts for the front ends of the rollers, said stub shafts having laterally curved supporting portions connected to said standards constituting guides, plate-like inwardly and upwardly inclined guard members on said standards disposed below the front ends of the rollers with their opposed edges in spaced relation to permit the tops of vegetables to be engaged by the rollers while limiting the upward movement of the roots of the vegetables, cutters arranged below and adjacent the rear ends of the rollers to act on the tops carried by the rollers, a delivery conveyor extending transversely below the cutters to receive the roots severed from the tops by the cutters, drive means on the carriage for the rear ends of the driving shafts and cutters, and a top carried disposed at the rear of the rollers to receive the severed tops.

13. In a machine of the class described, the combination with a carriage, of coacting lifting plows, conveyor rollers having forwardly tapered front ends disposed in spaced forwardly inclined coacting relation at the rear of said lifting plows and provided with spiral ribs arranged in spaced intermeshing relation, the ribs at the front ends of the rollers comprising a plurality of spaced complementary segments, supporting and driving means for said rollers, guard members disposed below the front ends of the rollers to permit the tops of vegetables to be engaged by the rollers while limiting the upward movement of the roots of the vegetables, and a cutter means disposed below the rollers to act on the tops carried by the rollers.

14. In a machine of the class described, the combination with a carriage, of coacting lifting plows, conveyor rollers disposed in spaced forwardly inclined coacting relation at the rear of said lifting plows and provided with spiral ribs arranged in spaced intermeshing relation, supporting and driving means for said rollers, fixed plate-like guard members disposed on said plows below the front ends of the rollers to permit the tops of vegetables to be engaged by the rollers while limiting the upward movement of the roots of the vegetables, and a cutter means disposed below the rollers to act on the tops carried by the rollers.

DOYLE B. MARSHALL.

REFERENCES CITED

The following references are of record in the file of this patent:

UNITED STATES PATENTS

| Number | Name | Date |
| --- | --- | --- |
| 1,149,644 | Graham | Aug. 10, 1915 |
| 1,273,757 | Fanger | July 23, 1918 |
| 1,280,207 | Glaze | Oct. 1, 1918 |
| 1,306,673 | Daniels | June 10, 1919 |
| 2,357,810 | Christiansen | Sept. 12, 1944 |
| 2,380,193 | Scott | July 10, 1945 |
| 2,418,575 | Christiansen | Apr. 8, 1947 |